US009857819B1

(12) United States Patent
Lu et al.

(10) Patent No.: US 9,857,819 B1
(45) Date of Patent: Jan. 2, 2018

(54) SYSTEM AND METHODS FOR MULTI-INPUT SWITCHING REGULATOR

(71) Applicant: Maxim Integrated Products, Inc., San Jose, CA (US)

(72) Inventors: Yang Lu, Chandler, AZ (US); Sean Lai, Chandler, AZ (US); Rui Liu, Fremont, CA (US); Hongguang Dong, Chandler, AZ (US); Dale Kemper, Chandler, AZ (US)

(73) Assignee: Maxim Integrated Products, Inc., San Jose, CA (US)

( * ) Notice: Subject to any disclaimer, the term of this patent is extended or adjusted under 35 U.S.C. 154(b) by 762 days.

(21) Appl. No.: 13/888,697

(22) Filed: May 7, 2013

Related U.S. Application Data

(60) Provisional application No. 61/792,509, filed on Mar. 15, 2013.

(51) Int. Cl.
*H02J 1/10* (2006.01)
*G05F 1/62* (2006.01)

(52) U.S. Cl.
CPC .................................... *G05F 1/62* (2013.01)

(58) Field of Classification Search
CPC ........... G05F 1/62; H02M 3/158; H02M 3/07; H02M 2001/0022
See application file for complete search history.

(56) References Cited

U.S. PATENT DOCUMENTS

| | | | | |
|---|---|---|---|---|
| 5,786,724 | A * | 7/1998 | Teggatz | H03K 5/003 327/333 |
| 6,229,289 | B1 * | 5/2001 | Piovaccari | H02M 3/1588 323/268 |
| 6,597,157 | B1 * | 7/2003 | Boeckmann | G05F 1/618 323/242 |
| 7,411,316 | B2 * | 8/2008 | Pai | H02M 1/10 307/81 |
| 2006/0170400 | A1 * | 8/2006 | Pai | H02M 1/10 323/265 |
| 2007/0018502 | A1 * | 1/2007 | Bazinet | H02M 1/10 307/80 |
| 2008/0007236 | A1 * | 1/2008 | Elbanhawy | H02M 3/157 323/283 |
| 2012/0001610 | A1 * | 1/2012 | Klein | H02M 3/1582 323/284 |
| 2012/0139516 | A1 * | 6/2012 | Tsai | H02M 3/158 323/282 |
| 2013/0069614 | A1 * | 3/2013 | Tso | H02M 3/07 323/288 |

* cited by examiner

*Primary Examiner* — Rexford Barnie
*Assistant Examiner* — Rasem Mourad
(74) *Attorney, Agent, or Firm* — North Weber & Baugh LLP

(57) ABSTRACT

Various embodiments of the invention provide for a multi-input switch regulator that is controlled to selectively receive power from one of multiple power sources in order to extend the range of available battery voltages at which the regulator can operate. Certain embodiments accomplish this by using an internal adaptive control circuit to coordinate multiple high-side switches to operate with a low-side switch to generate a desired output voltage.

13 Claims, 7 Drawing Sheets

SYSTEM AND METHODS FOR MULTI-INPUT SWITCHING REGULATOR

CROSS REFERENCE TO RELATED PATENT APPLICATIONS

The present application claims priority to U.S. Provisional Application Ser. No. 61/792,509 titled "System and Methods for Multi-Input Switching Regulator," filed on Mar. 15, 2013 by Yang Lu, Sean Lai, Rui Liu, Hongguang Dong, and Dale Kemper, which application is incorporated herein by reference in its entirety.

BACKGROUND

A. Technical Field

The present invention relates to power converters, and more particularly, to systems, devices, and methods of operating DC-DC switching regulators with multiple power sources.

B. Background of the Invention

Portable electronic consumer products are becoming increasingly popular. Due to their mobile nature, these products are typically equipped with batteries, which are known to have limited capacity and run time. Most manufacturers' techniques aimed at meeting ever increasing demand for longer run times of power hungry devices, for example radio frequency (RF) power amplifiers that enable cellular telephone communication, involve reducing size, weight, and power consumption.

However, as these techniques are rapidly approaching physical limitations, such as the maximum achievable energy density in batteries, manufacturers have come to realize the importance of efficiency management solutions to further extend the run time of portable devices. In general, battery-operated devices cease to operate below their cutoff voltage, as determined by the discharge curve inherent to each battery. At present, typical cut-off voltages for various cell phone or tablet devices are around 3.4 V. This voltage corresponds to the low end of the typical battery usage range that currently spans a voltage range of about 3.4 V to 4.2 V.

In order to prevent premature loss of communication in these devices, it would be desirable to extend the battery operational voltage life to a range below the existing cutoff voltage.

SUMMARY OF THE INVENTION

Various embodiments of the invention provide for multiple high-side switches that together with a single low-side switch and an inductor form a multi-input switching regulator with high conversion efficiency.

In certain embodiments of the invention, the multi-input switch regulator is a multi-input buck converter that adaptively selects to receive power either directly from a primary power source, for example a battery or, alternatively, from a secondary power source such as a boost converter. This allows the switch regulator to operate at output voltages higher than the battery voltage by switching to the power source with a higher supply voltage as soon as the battery voltage falls below a cutoff value, As a result, the range of available battery voltages at which the switch regulator can operate is extended.

In certain embodiments, an internal adaptive control circuit is employed to monitor voltages at various circuit locations, including the primary and secondary power source and/or the output of the multi-input switch regulator. Based on a set of predetermined conditions, the control circuit selects an appropriate input power source to generate the desired output voltage. The control circuit is designed to ensure seamless transitions between power sources, maintain efficiency across wide range of battery operation voltages, and improve transient response time.

Certain features and advantages of the present invention have been generally described here; however, additional features, advantages, and embodiments are presented herein will be apparent to one of ordinary skill in the art in view of the drawings, specification, and claims hereof. Accordingly, it should be understood that the scope of the invention is not limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

Figure 1:
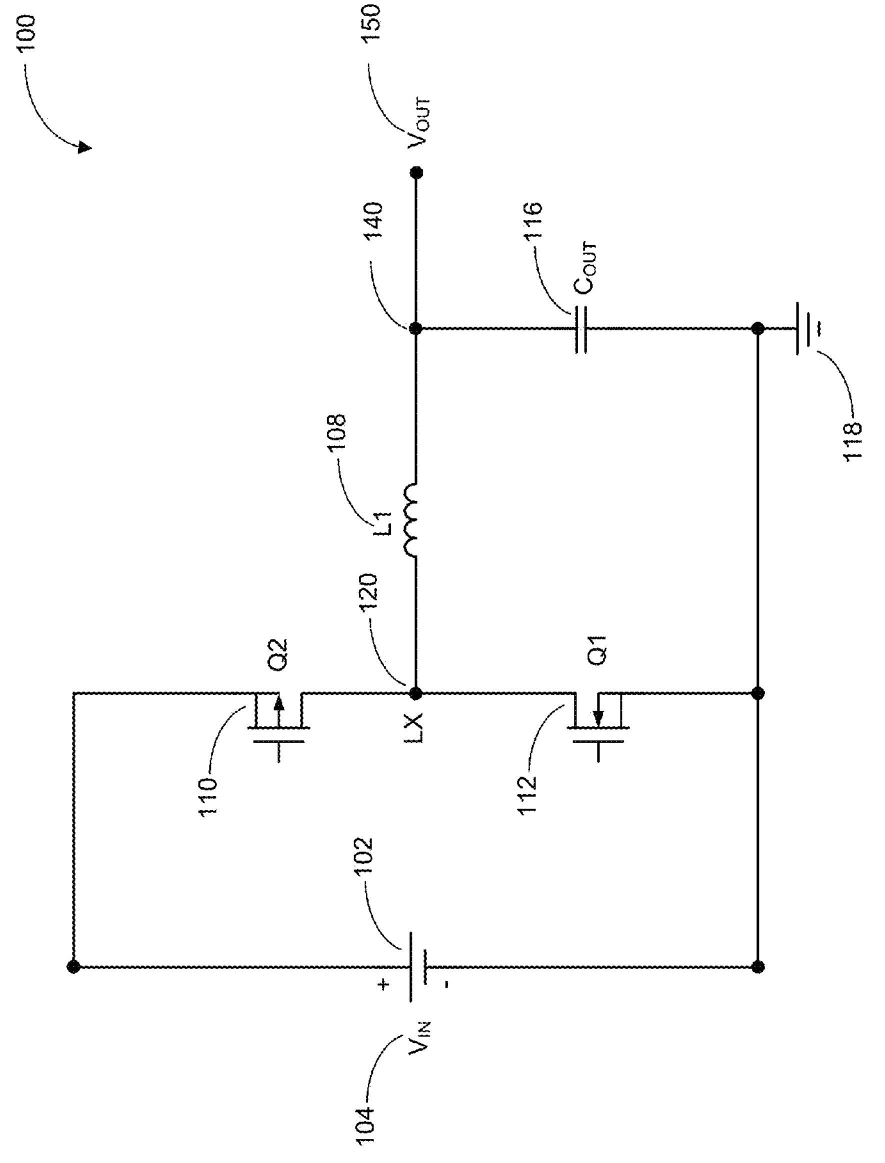
FIGURE 1 Prior Art
FIG. 1 is a prior art DC-DC buck converter having a single input.

FIG. 1 is a prior art DC-DC buck converter design having a single input. Buck converter 100 comprises power supply 102, PMOS transistor 110, NMOS transistor 112, inductor 108, and output capacitor 116. Power supply 102, for example by a Li-ion battery, is applied to the source of PMOS transistor 110, while the source of NMOS transistor 112 is connected to ground. The gates of transistor 110 and 112 are controlled by gate driving signals generated by a duty cycle controller, not shown in FIG. 1. The drains of both transistors 110, 112 are connected each other and to switching voltage node LX 120. Node LX 120 is connected to a first terminal of inductor L 108. The other terminal is connected to output voltage node 140, which is AC coupled to ground via output capacitor 116. Output voltage $V_{OUT}$ 150 is used to drive an external device, such as a microcontroller or a sensor (not shown) that has a voltage requirement (e.g., 1.2 V) that is lower than input voltage 104.

In operation, when the gate of PMOS transistor 110 receives a low state signal, PMOS transistor 110 turns on, and when PMOS transistor 110 receives a high state signal, PMOS transistor 110 turns off. Conversely, when the gate of NMOS transistor 112 receives a high state signal, NMOS transistor 112 turns on, and when NMOS transistor 112 receives a low state signal, NMOS transistor 112 turns off. The repeated switching drives a current through inductor L 108 and the load. Transistors 110 and 112 are alternately turned on to generate a square wave shaped voltage signal at switching node LX 120. The square wave voltage $V_{LX}$ generated at switching node 120 may have an amplitude equal to input voltage $V_{IN}$ 104 and a constant switching frequency.

The duty cycle controller monitors and adjusts $V_{OUT}$ 150 to a desired voltage value by controlling the duty cycle of buck converter 100 via the gate drive signals of transistors 110 and 112. Voltage $V_{LX}$ at node LX 120 is filtered by inductor 108 and output capacitor 116 that form an LC filter to obtain a DC voltage output $V_{OUT}$ 150. The inductance value of inductor L 108 and capacitance value $C_{OUT}$ of capacitor 116 are chosen to limit the ripple on $V_{OUT}$ 150 to an acceptable range that is determined by the requirements of the load and the feedback of buck converter 100. Once the battery reaches its cutoff value, for example 3.6 V, buck converter 100 ceases to operate at desired output voltage 150. Therefore, to prevent premature termination, it would be desirable to extend the battery operational voltage to a range below the existing cutoff voltage.

Figure 2:
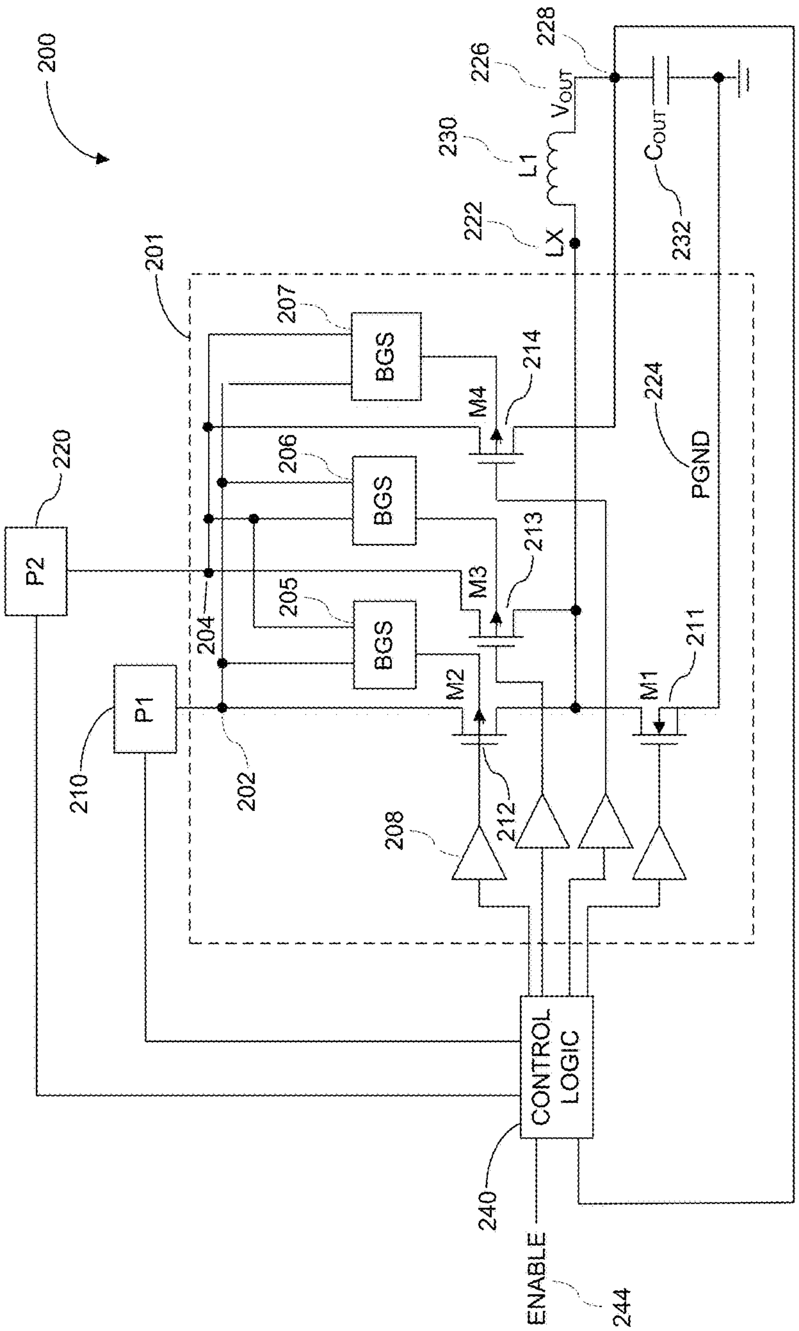
FIG. 2 illustrates a multi-input switching regulator system according to various embodiments.

FIG. 2 illustrates a multi-input switching regulator system according to various embodiments. System 200 comprises first and second power sources 210 and 220, respectively. In this example, first power source 210 is a boost converter that is coupled to a rail voltage, and second power source 220 is a battery. An output terminal of boost converter 210 and battery 220 are coupled to multi-input switching regulator 201 and control logic 240. Control logic 240 is coupled to receive enable signal 244 and, for example, output voltage signals from boost converter 210 and battery 220. System 200 further comprises inductor 230 and output capacitor 232 coupled to switching regulator 201, which may both be external to switching regulator 201. As shown in FIG. 2, node LX 222 is coupled to one terminal of inductor 230 that is opposite to the other terminal coupled to output node 228.

Multi-input switching regulator 201 comprises input node 1 202, input node 2 204, back-gate switcher 205-207, and switch M1-M4 211-213. Input node 1 202 is configured to couple to first power source 210. Input node 2 204 is configured to couple to second power source 220. In this example, switches M2 212, M3 213, and M4 213 are high-side switches. Switch M2 212 is coupled to input node 1 202 to connect to first power source 210, while switch M3 213 is coupled to input node 2 204 to connect to second power source 220, such that input nodes 1 202 and 2 204 are each coupled, via switch M2 212 and M3 213, respectively, to common node LX 222.

It is understood that the order and numbering of switches M1-M4 211-214 and power input nodes 202, 204 merely establishes an exemplary order and that other combinations will be apparent to one of skill in the art. In one embodiment, switch M4 214 is a conventional bypass FET that is coupled between input node 2 204, e.g., the output of battery 220 and output voltage $V_{OUT}$ 226 at output node 228. Switch M4 214 is configured to bypass battery 220 as needed. Output voltage $V_{OUT}$ 226 is a desired output voltage that may be programmed via control logic 240 or a processor (not shown).

Both switches M2 212 and M3 213 are coupled to switch M1 211, such that all three switches share common terminal LX 222. In this example, M1 211, which is grounded at its drain terminal, is implemented as a low-side n-type MOSFET, while switches M2-M4 212-214 are implemented as high-side p-type power MOSFETs that enable switching at relatively high switching frequencies, which facilitates a reduction in component size. A person of skill in the art will recognize that any type of switch may be employed. For example, in applications where size is a less important design consideration, BJTs may be used to implement switching regulator 201. In such applications, one or more back-gate switchers 205-207 may be eliminated. The drains of switches M2 212 and M3 213 are coupled to the source of switch M1 211. The drain of switch M4 214 is coupled to output node 228. As shown, three back-gate switchers 205-207 are coupled between the gates of high-side power p-channel MOSFET switches M2-M4 212-214 and their respective input sources 210 or 220.

Figure 6:
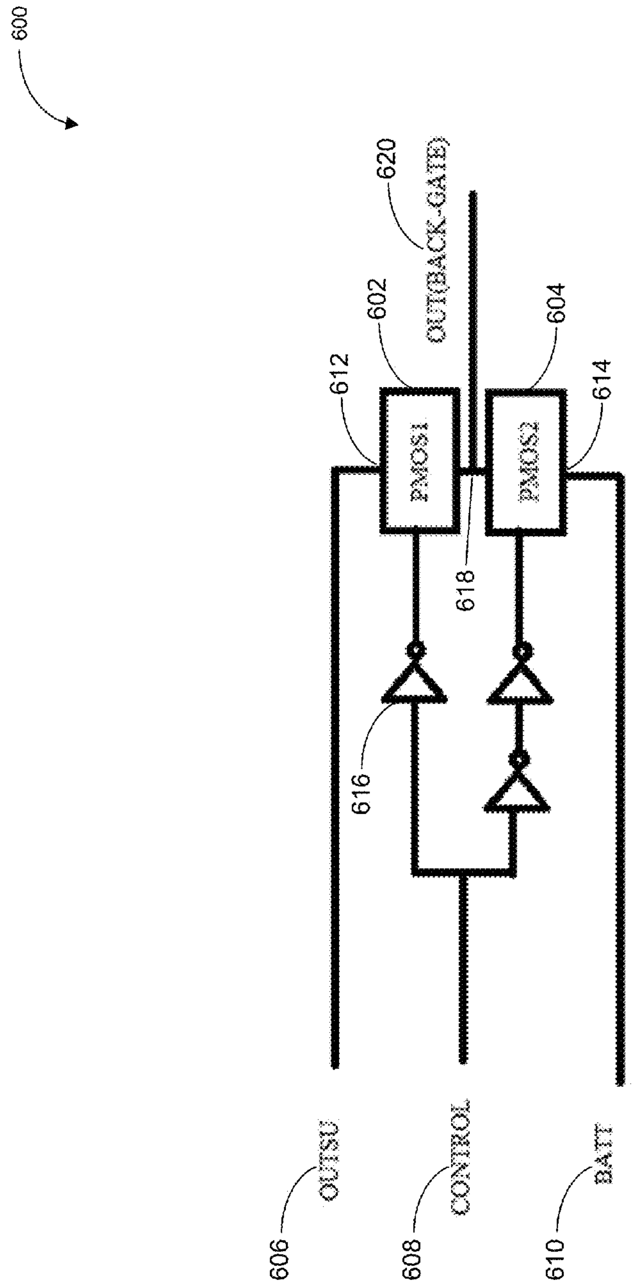
FIG. 6 is a block diagram of an exemplary back-gate switcher according to various embodiments of the invention.

Because some of MOSFET switches M2-M4 212-214 may operate at a different rail supply voltages, their body potentials should be regulated by back-gates switchers in order to prevent leakage current through the body diode of the pMOS switch. In one embodiment, switch M4 214 is sized different from switches M2 and M3 212-213, which provides for different dropout voltages (or different $R_{DS\_oN}$) for the same current rating. Therefore, based on trade-offs in design between small $R_{DS\_ON}$ and increased layout, back-gate switcher 207 is sized different than back-gate switcher 205, 206. FIG. 6 gives an illustration of a block diagram of an exemplary back-gate switcher.

Switches M1-M4 211-214 are driven by corresponding gate drivers 208, that receive control signals from a digital control circuit (not shown), which controls the gate switching of switches M1-M4 211-214, for example, in response to enable signal 244. Gate drivers 208 may be embedded within a common driver stage and may be driven in any combination, for example as two sets of signals to drive four M1-M4 211-214. Control logic 240 is configured to couple M1 211 to one of switches M2 212 and M3 213 to form a multi-input buck converter that operates with multiple power sources 210, 220, based on predetermined switching conditions.

The so formed buck converter may be controlled by control circuit 240 in any regulation mode, for example, Pulse Width Modulation (PWM) regulation. In one embodiment, control circuit compromises a processor that sets parameters that determine the transitioning conditions associated with the operation of switching regulator 201 in various power modes. Control circuit 240 is an adaptive control architecture that is coupled to switching regulator 201 to monitor the voltages at the outputs of boost converter 210 and battery 220 and, based on predetermined conditions of mode transitions, automatically enable a transition to the appropriate input power source in order to maintain or generate a desired output voltage $V_{OUT}$ 226.

In one embodiment, control circuit 240 uses a comparator circuit to activate switching between switches M1 211, M2 212, and M3 213 based on three distinct switching conditions. In this example, the switching conditions mainly depend on when the voltage of battery 220 falls below a predefined voltage and whether a programmed output voltage $V_{OUT}$ 226 exceeds the voltage of battery 220.

In operation, based on predetermined switching conditions, multi-input switching regulator 201 switches between a plurality of operational states without being subject to inrush currents or glitches. In one embodiment, the adaptive control architecture employs a control algorithm that evaluates switching conditions depending on voltages of input power sources 210, 220 in relationship to output voltage $V_{OUT}$ 226. In one embodiment, switching conditions are defined by a difference between the voltage of input node 1 202, i.e., the output voltage of boost converter 210 and the voltage of input node 2 204, i.e., the output voltage of battery 220 a in relation to the output voltage $V_{OUT}$ 226. The corresponding voltages may be obtained by any means known to a person of skill in the art, for example, by direct or indirect measurement.

Based on the determination, in one embodiment, if the voltage at input node 2 204 exceeds output voltage 226 by a predetermined threshold value $V_{TH}$, e.g., 200 mV, switching regulator 201 enters into a first mode of operation. In this mode, the adaptive control circuit automatically causes low-side switch M1 211 to couple to high-side switch M3 213, for example by generating appropriate enable signals, while M2 212 and M4 214 are turned off. This operation forms a buck converter that steps the voltage at input node 2 204 down to output voltage 226. In this configuration, the buck inductor is charged when M1 211 is switched off and M3 213 is switched on. Conversely, the buck inductor will be discharged when M1 211 is switched on and M3 213 is switched off. In this example, input node 2 204 is coupled to battery 220, and mode 1 may be considered a "normal" battery operation mode in which the condition for mode is satisfied when the output voltage of battery 220 exceeds, e.g., 3.2 V.

In one embodiment, if the voltage at input node 2 204 does not exceed output voltage 226 by a predetermined threshold value $V_{TH}$, but is greater than output voltage 226, then switching regulator 201 enters into a second mode of operation. In this mode, the adaptive control circuit causes switch M1 211 to couple to switch M4 214, while M2 212 and M3 213 are turned off. M4 214 may be implemented as a bypass FET that reduces drop-out when switch M2 212 or M3 213 is close to drop-out mode, i.e., the output voltage 226 is too close to the output voltage of battery 220 to support a large load current and maintain low conduction losses, e.g., when the output voltage of battery 220 falls to 3.2 V and below. In this configuration, M4 214 bypasses input node 2 204 to couple input node 1 202 directly to output voltage node 228 in order to prevent a buck switching configuration from operating as a switching regulator.

In one embodiment, if the voltage at input node 2 204 falls below output voltage 226, switching regulator 201 enters into a third mode of operation. In this mode, the adaptive control circuit causes switch M1 211 to couple to switch M2 212, while M3 213 and M4 214 are turned off. When M2 212 takes over the high-side switch function, this forms a buck converter that steps the voltage at input node 1 202, for example a 5 V booster circuit output voltage, down to output voltage 226. In this configuration, the buck inductor is charged when M1 211 is switched off and M2 212 is switched on. Conversely, the buck inductor will be discharged when M1 211 is switched on and M2 212 is switched off. This mode of operation is similar to the second mode of operation, except that the power source is no longer the output voltage of boost converter 210 but the output voltage of battery 220. In one embodiment, the on-times of switches M2 212, M3 213, and M4 214 do not overlap, such that only one of four power MOS FETs M2-M4 212-214 operates at any given time depending on a plurality of conditions.

Although switching regulator 201 is likely to experience a relatively small reduction in efficiency when operating below the cutoff voltage of prior art designs (e.g., 3.4 V) when compared to the efficiency in the operating range above cutoff (e.g. 3.4 V-4.35 V), the ability to lower the cutoff voltage (e.g., from 3.4 V to 2.7 V) significantly extends battery life and enhances user friendliness by not terminating device operations as soon as the battery voltage drops below the cutoff voltage.

Figure 3:
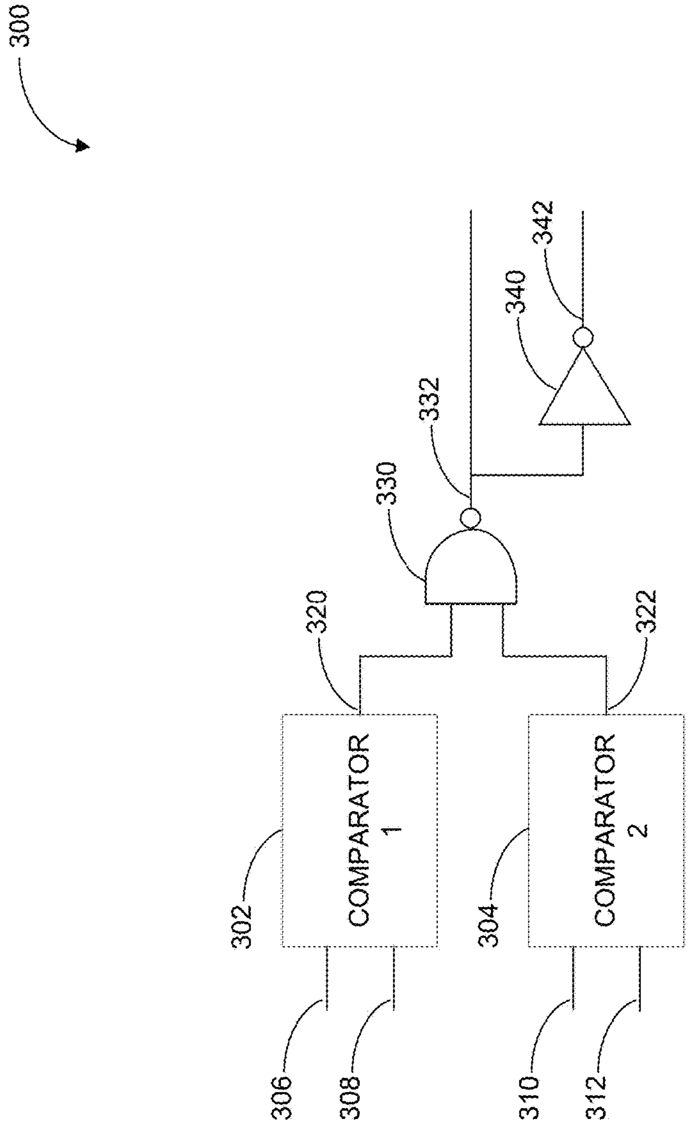
FIG. 3 shows an exemplary multi-input switching regulator control logic according to various embodiments.

FIG. 3 shows an exemplary multi-input switching regulator control logic according to various embodiments. Control logic 300 comprises comparators 302 and 304, NAND gate 330, and inverter 340. As shown, each comparator 302, 304 comprises two input terminals 306, 308 and 310, 312, respectively, and one output terminal 320 and 322, respectively. Comparator 302 is coupled to receive, for example, output voltages from multiple power sources. In this example, comparator 302 receives the output voltage of the boost converter at terminal 306 and the output voltage of the battery at terminal 308. Similarly, comparator 304 receives the output voltage of the battery at terminal 310 and a predetermined battery threshold voltage at terminal 312. In this example, output 332 of NAND gate 330 is coupled to semiconductor switch M2 of FIG. 2, while output 342 of inverter 340 are coupled to semiconductor switch M3 of FIG. 2. NAND gate 330 and inverter 340 may be implemented using diodes and/or electronic switching devices.

In operation, comparator 302 compares inputs 306 and 308 to determine whether the output voltage of the boost converter exceeds the output voltage of the battery, i.e., whether the signal at input terminal 306 exceeds signal at input terminal 308. If so, comparator 302 outputs a logic high that is input to one terminal NAND gate 330 indicating that the boost converter is ready to take over the power supply function of the battery. Comparator 304 compares the signals at input terminals 310 and 312 to determine whether the battery voltage is below a predetermined threshold voltage. If the signal at input terminal 312 exceeds the signal at input terminal 310, e.g., the battery voltage is below the threshold voltage, comparator 304 produces a logic high output signal 322 that is input to the other input terminal of NAND gate 330 indicating that the battery voltage is low.

In this example, only when both output signals 320 and 322 are at logic high, i.e., both conditions that the boost converter is ready and the battery voltage is low are fulfilled, the signal at the output terminals of NAND gate 330 is low, which causes switch M2 to turn on, otherwise the output of NAND gate 330 produces a logic high, such that inverter 349 keeps switch M3 turned on.

One skilled in the art, will appreciate that many other configurations and devices are possible to achieve the functions of the invention. For example, comparators 302, 304 may be replaced with any other device that processes the detected conditions of the various inputs of the switching regulator. Further, switching devices, such as M2 and M3, may be activated by any other logic device known in the art.

Figure 4:
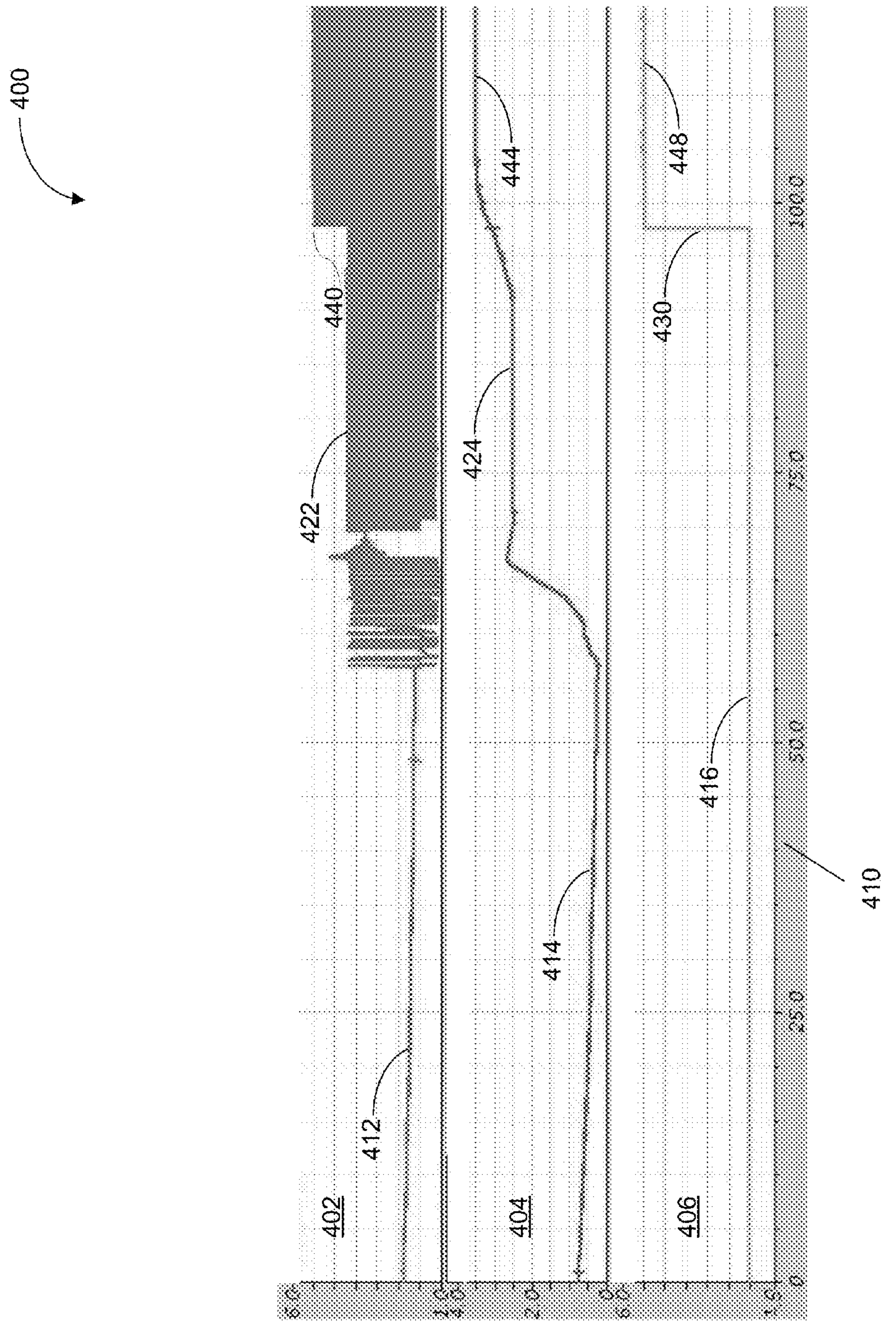
FIG. 4 illustrates characteristic voltages for inductor, output, and control signals for the multi-input switching regulator in FIG. 3 responding to an increase in output voltage.

FIG. 4 illustrates characteristic voltages for inductor, output, and control signals for the multi-input switching regulator in FIG. 3. Upper graph 402 shows the node voltage at one terminal of the inductor of the switching regulator. Middle graph 404 shows the output voltage of the switching regulator. Lower graph 406 shows the control signal received from the power amplifier circuit. Together the graphs 402-406 illustrate an automatic transition from one mode of operation to another.

In detail, graphs 402-406 are plotted against time scale 410, which extends from 0 μsec to about 120 μsec. Once control signal 416 enters a logic high state to enable a transition, as represented by step 430 and the adaptive control circuit detects an increase in the desired or programmed output voltage 414 at time 95 μsec., a control signal received from the adaptive control circuit causes the regulator to switch the active combination of transistors from M1 and M3 to the combination M1 and M2. As a result, the switching regulator switches from input node 2 that is coupled to the second power source to input node 1 that is coupled to the first power source.

In this example, the first power source is a boost and the second power source is a battery. Prior to the transition point, the system operates in a "normal" battery mode, such that the battery provides the necessary input power to output a voltage of about 2.5 V in region 424. Once a higher output voltage 444, here 3.6 V, is requested, and output voltage 414 rises above a predetermined threshold of 3 V, the output voltage of the battery is insufficient to support the requested output voltage. At this point, control signal 406 enables the transition to the boost output, as indicated by step 430. As a result, the multi-input switching regulator switches to the next mode in which output voltage 404 can assume the desired higher value of 3.6 V in region 444.

Note that both before and after the transition the switch regulator operates in step down mode. Also note that switch M4 is not shown in this example, as M4 is not involved in the transition.

Figure 5:
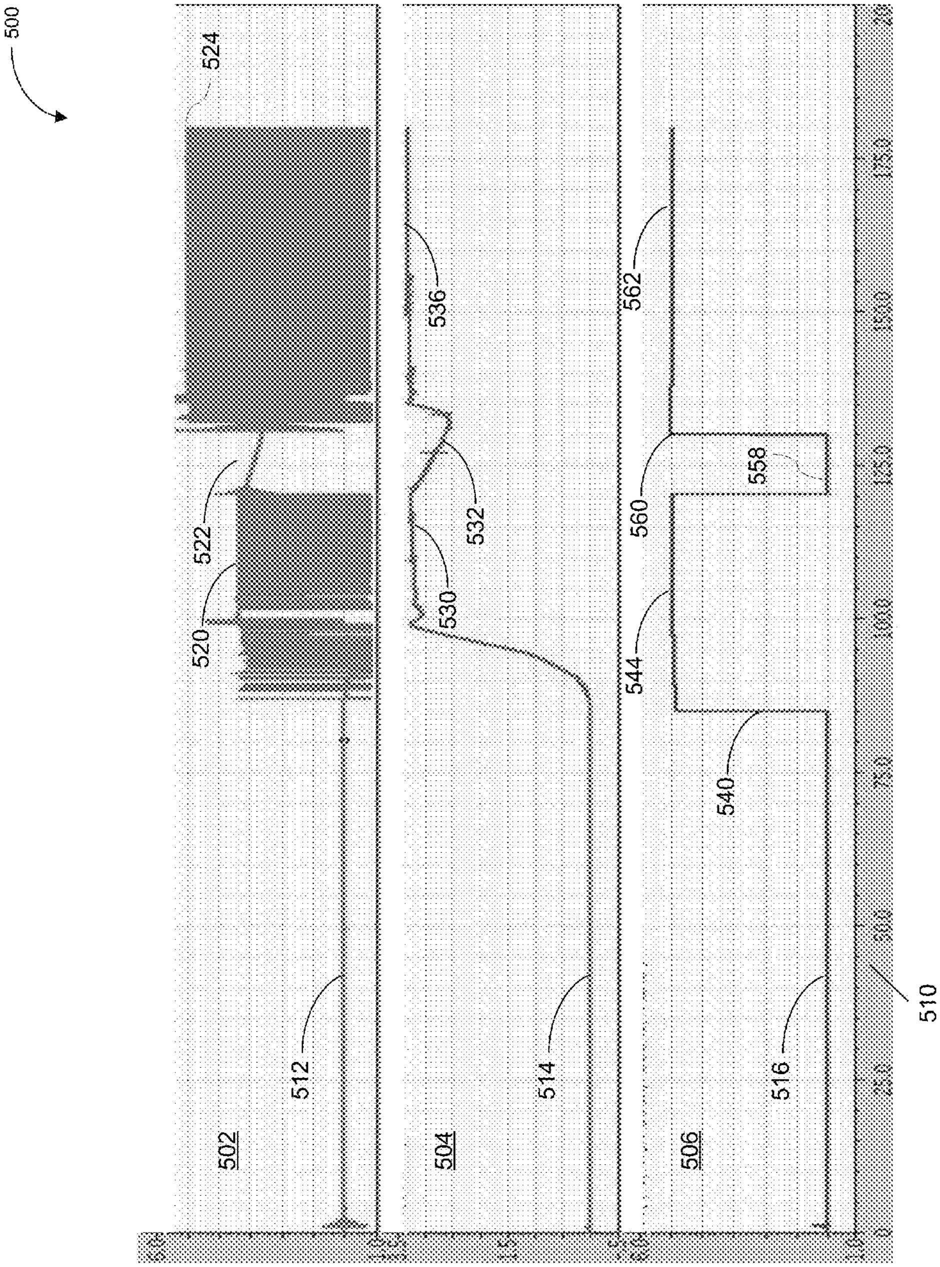
FIG. 5 shows characteristic voltages for inductor, output, and control signals illustrating signal for an automatic transition in response to a decay in power supply voltage.

FIG. 5 shows characteristic voltages for inductor, output, and control signals illustrating an automatic transition event in multi-input switching regulator in FIG. 3 in response to a decay in power supply voltage. As in FIG. 4, upper graph 502 shows the node voltage at one terminal of the inductor of the switching regulator. Middle graph 504 shows the output voltage of the switching regulator. Lower graph 506 shows a control signal received from the power amplifier circuit.

As shown in FIG. 5, time scale 510 extends from 0 μsec to 180 μsec. After enable signal 506 transitions from a low state 516 (e.g., 0 V) to a high state 540 (e.g., 5 V), assuming that the multi-input switching regulator is coupled to a boost as a first power source and a battery as the second power source, the battery ramps output voltage 514 to its output value 530 through an inductor that is driven by inductor voltage 512. Inductor voltage 512 operates at battery voltage 520 (e.g., 3.6 V) until the battery output starts decreasing in region 522. The decrease in inductor voltage 512 continues until, at time 130 μsec., control signal 516 returns to a logic high state, as represented by step 560 to re-activate the switching process and the adaptive control circuit reacts to the decrease in inductor voltage 512, which is representative of the decay of the battery voltage. At this point, the output voltage of the battery is no longer sufficient to support the requested output voltage and the adaptive control circuit issues a control signal that causes the regulator to switch the active combination of transistors from M1 and M3 to a combination M1 and M2. As a result, the switching regulator switches power supplies from battery operation to the boost output to take advantage of the higher voltage of the boost output voltage, here 5V 536. While FIG. 5 shows that the battery starts decaying at the end of region 520 at the same time control signal 516 is turned off, one of skill in the art will appreciate that the output voltage of a power source may decrease at any time, e.g., in response to a large load.

FIG. 6 is a block diagram of an exemplary back-gate switcher according to various embodiments of the invention. Back-gate switcher 600 comprises input terminal 606-610, output terminal 620, p-channel MOSFET 602, 604 and inverter 616. In this example, PMOS transistors 602, 604 are sized equally. As shown, input terminal 606 is coupled to source terminal 612 of PMOS transistor 602, while input terminal 610 is coupled to source terminal 614 of transistor 604. Output terminal 620 of back-gate switcher 600 is coupled to drain terminal 618 of PMOS transistor 602, 604. Output terminal 620 is configured to couple to the back-gate of one of respective switches M2, M3, and M4 shown in FIG. 2.

Figure 7:
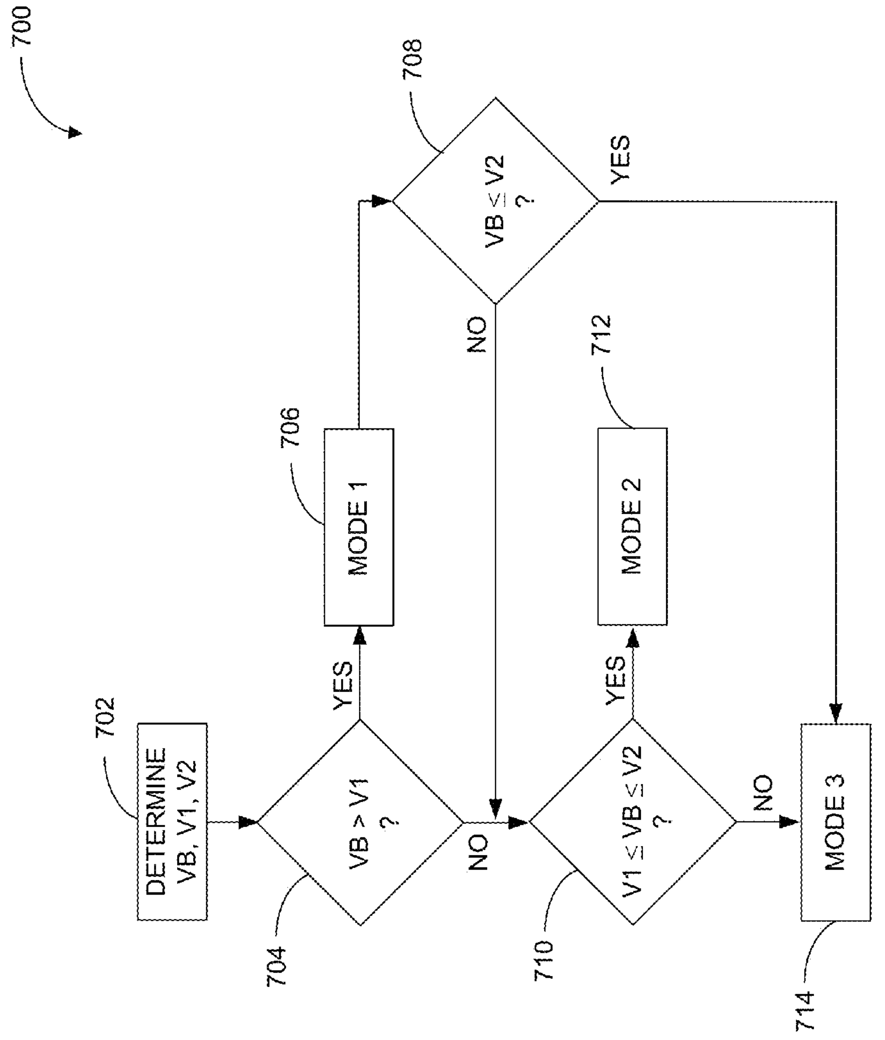
FIG. 7 is a flowchart of an illustrative process for operating a switching regulator with multiple power sources in accordance with various embodiment of the invention.

FIG. 7 is a flowchart of an illustrative process for operating a switching regulator with multiple power sources in accordance with various embodiment of the invention. The process for operating a switching regulator with multiple power sources 700 starts at step 702 by determining voltages VB, and voltages V1 and V2. In one embodiment, VB is a battery voltage; voltage V1 is the sum of a threshold and an output voltage; voltage VB is a battery voltage; and voltage V2 is a voltage that is relatively higher than voltage V1.7

At step 704, it is determined whether voltage VB exceeds voltage V1.

If so, then at step 706, the process enters into mode 1 and determines whether voltage VB is less than or equal voltage V2, at step 708. Mode 1 is characterized by enabling a first power source, for example, a battery. If voltage VB is less than or equal voltage V2, process 700 enters mode 3 at step 714. Otherwise, process 700 continues with step 710.

On the other hand, if at step 704, it is determined that voltage VB does not exceed a voltage V1, then process 700 also enters step 710.

At step 710, it is determined whether voltage VB is large or equal to voltage V1 but less than or equal to voltage V2. If so, process 700 enters mode 2 at step 712. Mode 2 is characterized by enabling a second power source. Otherwise, process 700 enters mode 3, at step 714. Mode 3 is characterized by bypassing a power source, for example, the first power source.

It will be appreciated by those skilled in the art that fewer or additional steps may be incorporated with the steps illustrated herein without departing from the scope of the invention. No particular order is implied by the arrangement of blocks within the flowchart or the description herein.

It will be appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

We claim:

1. A power management circuit comprising:

a first high-side switch coupled between a first power source that delivers a first voltage and a common node;

a second high-side switch coupled between a second power source that delivers a second voltage and the common node;

a controller coupled to receive the first voltage and the second voltage to perform two or more voltage comparisons;

a low-side switch coupled to an inductive element, the low-side switch, controlled by the controller, couples to the first and the second high-side switches to selectively convert the respective first or second voltage into an output voltage, the first high-side switch couples to the low-side switch when the second voltage is less than a predetermined voltage and the first voltage exceeds the second voltage;

and a third high-side switch coupled between the second power source and an output node directly, the output node coupled to the common node via the inductive element.

2. The circuit according to claim 1, wherein the third high-side switch is sized differently from any of the first and second high-side switches.

3. The circuit according to claim 2, further comprising a first back gate switch coupled between the second high-side switch and the first power source, the back gate switch regulates the second high-side switch.

4. The circuit according to claim 3, further comprising a second back gate switch coupled between the third high-side switch and the second power source, the second back gate switch being sized differently from the first back gate switch.

5. The circuit according to claim 1, wherein the first power source is an external power source.

6. The circuit according to claim 1, wherein a drain of the first high-side switch is coupled to the inductive element.

7. A power management system comprising:

a first high-side switch coupled between a first power source that delivers a first voltage and a common node;

a second high-side switch coupled between a second power source that delivers a second voltage and a common node;

a low-side switch coupled to an inductive element;

a third high-side switch coupled between the second power source and an output node directly, the output node coupled to the common node via the inductive element; and a control circuit controlling the low-side switch to couple to the first and second high-side switches to selectively convert the respective first or second voltage into an output voltage in response to the control circuit detecting a predetermined switching condition, the first high-side switch couples to the low-side switch when the second voltage is less than a predetermined voltage and the first voltage exceeds the second voltage.

8. The system according to claim 7, wherein the control circuit is coupled to determine one or more of the first, second, and output voltages, the control circuit selectively couples the first and second power source to one of the second high-side switch, third high-side switch, and low-side switch based on the predetermined switching condition.

9. The system according to claim 7, wherein the predetermined switching condition comprises the second voltage falling below a predefined voltage.

10. The system according to claim 7, wherein the predetermined switching condition comprises the output voltage exceeding the second voltage.

11. The system according to claim 7, wherein the control circuit comprises a feedback path coupled to receive one or more of the first, second, and output voltage.

12. The system according to claim 7, wherein the control circuit comprises logic circuitry and drivers to perform pulse width modulation regulation.

13. The system according to claim 7, wherein the first switch is a transistor that comprises a control terminal, the control terminal being controlled by the control circuit.

* * * * *